Oct. 2, 1928.  
J. A. WILSON  
1,685,893  
FLEXIBLE COVERING MATERIAL AND METHOD OF MAKING THE SAME  
Original Filed Nov. 12, 1923

INVENTOR  
John A. Wilson  
BY  
Braselton, Whitcomb & Desjardins  
ATTORNEYS

Patented Oct. 2, 1928.

1,685,893

UNITED STATES PATENT OFFICE.

JOHN A. WILSON, OF ELIZABETH, NEW JERSEY, ASSIGNOR TO DURATEX CORPORATION, OF NEWARK, NEW JERSEY, A CORPORATION OF NEW JERSEY.

FLEXIBLE COVERING MATERIAL AND METHOD OF MAKING THE SAME.

Original application filed November 12, 1923, Serial No. 674,313. Divided and this application filed June 2, 1924. Serial No. 717,299.

The present invention relates to an improved flexible covering material and the method of making the same. It has to do, more particularly, with a flexible covering material which may be manufactured at a low cost and which may be used as a substitute for leather, or rubber coated fabrics, as a covering for furniture, or a top or deck material for use in connection with automobiles, and for other similar purposes. The present application is a division of my Patent No. 1,501,156, issued July 15, 1924.

The main object of my present invention is to provide a flexible covering material which may be manufactured at a low cost, has many highly desirable qualities, is of such a character that it may be used as a substitute for leather, as a covering for furniture, or as a top or deck material for automobiles, and in many similar situations.

A further object of my invention is to provide a flexible covering material of this character which employs burlap as the base fabric so as to secure economy of manufacture by the use of a comparatively cheap and coarse fabric such as burlap.

A further object of my invention is to provide an improved method of making a flexible covering material of this character in which a burlap base is coated with a layer of cementing or water-proofing material, made up of oxidized oil or oils, and then provided with a surface coating of a suitable character which may be finished as desired.

Further objects, and objects relating to details and economies of construction and operation, will definitely appear from the detailed description to follow. In one instance, I accomplish the objects of my invention by the devices and means set forth in the following specification. My invention is clearly defined and pointed out in the appended claims. A material constituting one embodiment of my invention is illustrated in tne accompanying drawings, forming a part of this specification, in which Fig. 1 is a sectional view of a piece of burlap suitable for use as the base fabric in accordance with my invention.

Figure 1:
Figure 2:
Fig. 2 is a sectional view of a piece of burlap after it has been subjected to a smoothing operation.
Figure 3:
Fig. 3 illustrates the burlap after a layer of suitable cementing or water-proofing material has been applied thereto.
Figure 4:
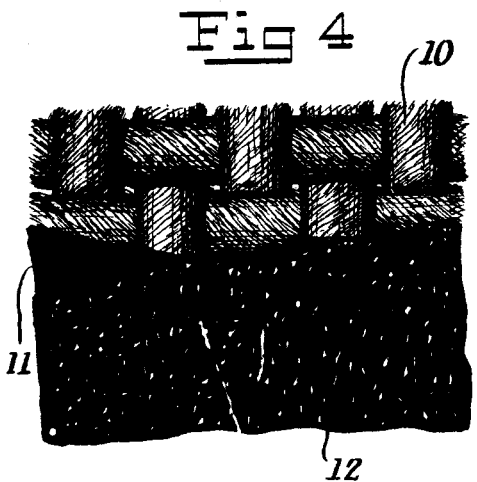
Fig. 4 shows one finished produce embodying my invention with a surface coating applied directly to this layer of cementing material.
Figure 5:
Fig. 5 is a view corresponding to Fig. 3 and shows the smoothed burlap base with a layer of cementing material applied thereto.
Figure 6:
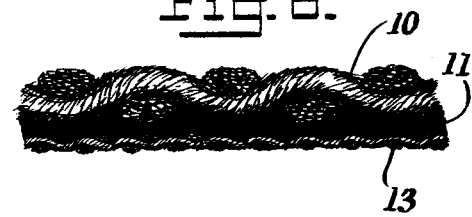
Fig. 6 illustrates a layer of facing fabric secured to the burlap base by means of this layer of cementing material.
Figure 7:
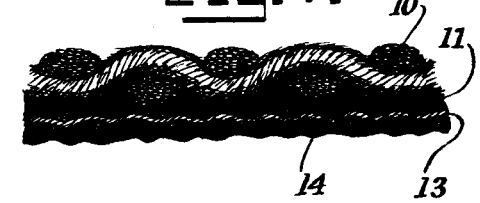
Figure 8:
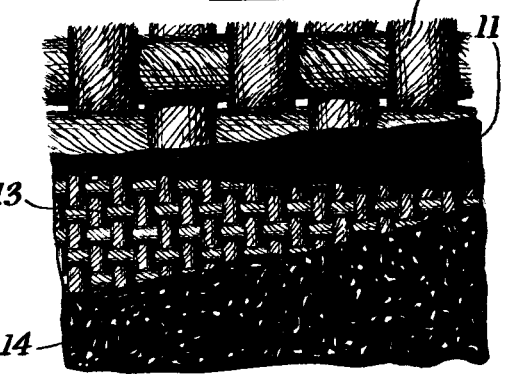

Fig. 7 is a sectional view through another material constituting an embodiment of my invention in which a surface coating is applied to the facing fabric secured to the burlap base by the layer of cementing material as illustrated in Fig. 6, and Fig. 8 is a plan view of a portion of the fabric illustrated in Fig. 7, parts of the layers being broken away to illustrate the successive layers of material.

In the drawings, the same reference numerals refer to the same parts throughout the several views.

In carrying out my invention, I first propose to take a fabric, such as burlap, which is of comparatively open mesh and woven from threads made of coarse fibres such as jute, and subject this burlap to a calendering operation which smooths it out and flattens the threads so that the coarse weave is not as prominent as it would otherwise be. This step is not absolutely essential, but I find it desirable because it prevents the coarse weave of the base fabric showing in the finished material. I next apply to this smoothed burlap base, 10, a layer, 11, of a cementing or water-proofing material which, in accordance with my present invention, consists of properly treated oxidized oil or oils, such as linseed oil, for example. Such oils have the property of remaining in a plastic, or semi-plastic, state for a considerable period of time, and set after exposure to the air for a considerable period. Having applied this layer of oxidized oil to the burlap base, I may next apply a surface coating, 12, directly to this intermediate layer of oxidized oil. This surface coating may well be of pyroxylin composition having suitable oils included therein to give the film the desired flexibility, and such pigments as are usual and as may be desired. The material thus produced constitutes one embodiment of my invention, and it may be embossed or the surface coating finished in any suitable way to give the desired appearance.

I have found it very desirable also, instead of applying the surface coating directly to the layer of oxidized oil, to cement or fasten to the burlap base, 10, a layer of suitable fabric, 13, such as sheeting, by means of this intermediate layer, 11, of cementing material, such as oxidized oil. The sheeting having been cemented or doubled to the burlap base by means of the layer of oxidized oil, the surface coating, 14, of pyroxylin may be then applied to the sheeting, such pyroxylin having added thereto oils or pigments to give the desired flexibility and color of film, in the manner well understood in the art. This pyroxylin film may be, and preferably is, relatively thin, and the intermediate layer of cementing material, formed in this instance of linseed oil or suitable oxidized oil, has sufficient thickness and body to receive and retain the embossing impression. The material may be embossed after the surface coating has been applied thereto, and the subsequent setting of the intermediate layer of oxidized oil, due to exposure to air, will preserve the embossing impression therein.

Burlap is a fabric which has been known for a long time and which is relatively very cheap, as compared with the fabrics which have heretofore been used in the production of pyroxylin coated material. Burlap has been regarded as entirely unsuitable as a base for pyroxylin coated fabrics, due probably to the fact that it is of notoriously open weave and that the fibres are coarse and brittle and of such a character that they would not appear to give a good anchorage for the pyroxylin film. Due to the open weave of the burlap, it would appear to require an unduly large amount of pyroxylin composition to produce the desired coating upon this material, since the open weave would take up large quantities of the coating composition. For such reasons, burlap has not been used as a base for pyroxylin coating material.

I have found, however, that by applying to the burlap base, an intermediate layer of suitable cementing material, in this instance, a layer of oxidized oil such as linseed oil, the cheap burlap may be used as a base without absorbing great quantities of the coating composition, and that a very satisfactory anchorage of the pyroxylin film may be secured. The intermediate layer of oxidized oil also adds to the water-proofing qualities of the pyroxylin film and the result is a flexible material which is clothlike in character and which is very flexible so that it may be bent through a considerable arc without cracking. This material has all the advantages of pyroxylin coated fabrics, in that a most excellent surface finish may be applied thereto in a variety of colors and designs. It also receives and retains, satisfactorily, an embossing impression. The result is that, with a burlap base, I have been able to obtain substantially the same and even better results than have heretofore been obtained by the application of a pyroxylin coating directly to the more expensive and closely woven fabrics, such as sateen or moleskin, for example.

I am aware that the particular material, and method of making it, disclosed in this application, may be varied considerably without departing from the spirit of my invention and, therefore, I desire to claim my invention broadly as indicated by the appended claims.

Having thus described my invention, what I claim as new and useful and desire to secure by Letters Patent is:—

1. A flexible, water proof, covering material comprising a burlap base, an intermediate layer of oxidized oil applied to said burlap base, and a surface coating of pyroxylin, said material being adapted to flex or bend through a considerable arc without cracking.

2. A flexible, water proof, covering material comprising a burlap base, an intermediate layer oxidized linseed oil applied to said base, and a surface coating adapted to be finished or embossed, said material being capable of flexing or bending through a considerable arc without cracking.

3. A flexible, water proof, covering material comprising a burlap base, an intermediate layer of oxidized oil applied to said burlap base, a facing fabric secured to said burlap base by said intermediate layer, and a surface coating applied to said facing fabric.

4. A flexible, water proof, covering material comprising a burlap base, an intermediate layer of oxidized oil applied to said burlap base, a facing fabric cemented to said burlap base by said intermediate layer, and a surface coating of pyroxylin applied to said facing fabric.

5. A flexible, water proof, covering material comprising a burlap base, an intermediate layer of oxidized linseed oil applied to said burlap base, a facing fabric cemented to said purlap base by said intermediate layer, and a surface coating of pyroxylin applied to said facing fabric.

6. The method of making a flexible covering material, comprising doubling a facing fabric to a burlap base by means of an intermediate layer of oxidized oil, and applying a surface coating to said facing fabric.

7. The method of making a flexible covering material, comprising doubling a facing fabric to a burlap base by means of an intermediate layer of oxidized oil, and applying a surface coating of pyroxylin to said facing fabric.

8. The method of making a flexible covering material, comprising doubling a facing fabric to a burlap base by means of an intermediate layer of oxidized linseed oil, and applying a surface coating to said facing fabric.

9. The method of making a flexible covering material, comprising doubling a facing fabric to a burlap base by means of an intermediate layer of oxidized linseed oil, and applying a surface coating of pyroxylin to said facing fabric.

10. The method of making a flexible covering material, comprising smoothing a burlap base, doubling a facing fabric thereto by means of an intermediate layer of oxidized linseed oil, and applying a surface coating of pyroxylin to said facing fabric.

In testimony whereof, I affix my signature.

JOHN A. WILSON.